(12) United States Patent
Aharoni et al.

(10) Patent No.: US 10,013,482 B2
(45) Date of Patent: Jul. 3, 2018

(54) CONTEXT-DEPENDENT EVIDENCE DETECTION

(71) Applicant: International Business Machines Corporation, Armonk, NY (US)

(72) Inventors: Ehud Aharoni, Kfar Saba (IL); Lena Dankin, Tel Aviv (IL); Dan Gutfreund, Raanana (IL); Tamar Lavee, Tel Aviv (IL); Ran Levy, Givatayim (IL); Ruty Rinott, Jerusalem (IL); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 14/720,847

(22) Filed: May 25, 2015

(65) Prior Publication Data

US 2016/0350410 A1 Dec. 1, 2016

Related U.S. Application Data

(60) Provisional application No. 62/014,135, filed on Jun. 19, 2014.

(51) Int. Cl.
*G06F 17/30* (2006.01)

(52) U.S. Cl.
CPC .. *G06F 17/30707* (2013.01); *G06F 17/30654* (2013.01); *G06F 17/30684* (2013.01)

(58) Field of Classification Search
None
See application file for complete search history.

(56) References Cited

U.S. PATENT DOCUMENTS

| | | | | |
|---|---|---|---|---|
| 8,280,885 | B2 * | 10/2012 | Cardie | G06F 17/30719 707/737 |
| 9,652,450 | B1 * | 5/2017 | Sacaleanu | G06F 17/2785 |
| 2009/0326925 | A1 * | 12/2009 | Crider | G06F 8/30 704/9 |
| 2010/0211379 | A1 * | 8/2010 | Gorman | G06F 17/2785 704/9 |
| 2012/0253793 | A1 * | 10/2012 | Ghannam | G06F 17/2785 704/9 |
| 2012/0301864 | A1 | 11/2012 | Bagchi et al. | |
| 2013/0110839 | A1 * | 5/2013 | Kirshenbaum | G06F 17/30705 707/740 |
| 2013/0325882 | A1 | 12/2013 | Deshpande et al. | |
| 2014/0012863 | A1 | 1/2014 | Sundaresan et al. | |
| 2014/0088955 | A1 * | 3/2014 | Kim | H04M 1/72522 704/9 |

* cited by examiner

*Primary Examiner* — Debbie Le (57) ABSTRACT

A method comprising using at least one hardware processor for: receiving a context; identifying evidence with respect to the context in at least one content resource, wherein the identifying comprises: identifying context-free features that generally characterize evidence in the at least one content resource, and identifying context features indicative of the relevance of text segments in the at least one content resource to the context; and outputting a list of said identified evidence.

20 Claims, 2 Drawing Sheets

CONTEXT-DEPENDENT EVIDENCE DETECTION

CROSS-REFERENCE TO RELATED APPLICATIONS

This application claims the benefit of U.S. Provisional Patent Application No. 62/014,135, entitled "Context-Dependent Evidence Detection", filed Jun. 19, 2014, the contents of which are incorporated herein by reference in their entirety.

BACKGROUND

The present invention relates to the field of data analysis.

Decision making is an important process people go through daily. Some decisions are made unconsciously, some are based on instinct, but in most cases, the evidence-based decision making is considered the best way. Examples may come from various domains such as politics, finance, healthcare etc. However, to make evidence-based decisions, people may require good and reliable evidence in real-time. As the quantity of available data grows, gathering the relevant evidence becomes a challenging resource staining task.

Text mining, also referred to as text analytics (or analysis), is often defined as the automated process of deriving high-quality information from text (specifically, large amounts of text) via computer processing. High-quality information is typically derived through the devising of patterns and trends through means such as statistical pattern learning and machine learning. Text mining usually involves the process of structuring the input text (usually parsing, along with the addition of some derived linguistic features and the removal of others, and subsequent insertion into a database), deriving patterns within the structured data, and finally evaluation and interpretation of the output. 'High quality' in text mining usually refers to some combination of relevance, novelty, and interestingness. Typical text mining tasks may include text categorization, text clustering, concept/entity extraction, production of granular taxonomies, sentiment analysis, document summarization, and entity relation modeling (i.e., learning relations between named entities).

Text analysis may involve information retrieval, lexical analysis to study word frequency distributions, pattern recognition, tagging/annotation, information extraction, data mining techniques including link and association analysis, visualization, and predictive analytics. The overarching goal may be, essentially, to turn text into data for analysis, via application of methods such as natural language processing (NLP) and analytical methods.

With continuous advancements and an increase in user popularity, data mining and text analysis technologies may serve as an invaluable resource across a wide range of disciplines.

The technology is now broadly applied for a wide variety of needs, including government, research and business needs. Applications of text analysis may include intelligence, security, e-discovery, records management, publishing, automated ad placement, social media monitoring, scientific discovery etc.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving a context; identifying evidence with respect to the context in at least one content resource, wherein the identifying comprises: identifying context-free features that generally characterize evidence in the at least one content resource, and identifying context features indicative of the relevance of text segments in the at least one content resource to the context; and outputting a list of said identified evidence.

There is provided, in accordance with another embodiment, a computer program product comprising a non-transitory computer-readable storage medium having program code embodied therewith, the program code executable by at least one hardware processor to: receive a context; identify evidence with respect to the context in at least one content resource, wherein the identifying comprises: identifying context-free features that generally characterize evidence in the at least one content resource, and identifying context features indicative of the relevance of text segments in the at least one content resource to the context; and output a list of said identified evidence.

There is provided, in accordance with a further embodiment, a system comprising: (i) a non-transitory storage device having stored thereon instructions for: receiving a context; identifying evidence with respect to the context in at least one content resource, wherein the identifying comprises: identifying context-free features that generally characterize evidence in the at least one content resource, and identifying context features indicative of the relevance of text segments in the at least one content resource to the context; and outputting a list of said identified evidence; and (ii) at least one hardware processor configured to execute said instructions.

In some embodiments, the context comprises at least one of a claim and a Topic Under Consideration (TUC).

In some embodiments, said identifying of said evidence comprises using a classifier for each type of evidence.

In some embodiments, said identifying of evidence further comprises: applying a context-free classifier, which uses only said context-free features, to said at least one content resource, to receive text segments in said at least one content resource predicted to include said evidence, and consecutively applying to said text segments a context classifier which uses only said context features to receive said evidence.

In some embodiments, said identifying of evidence further comprises assigning said text segments with scores reflecting the probability that said text segments comprise evidence, and said context classifier is applied to a predefined percentage of the text segments which are assigned with the highest scores.

In some embodiments, said identifying of evidence further comprises: identifying evidence text segments in the text of said at least one content resource, which may serve as evidence for the received context, and determining boundaries for said evidence in said at least one content resource.

In some embodiments, the method further comprises using said at least one hardware processor for dividing said text of said at least one content resource into sentences.

In some embodiments, said identifying of said evidence text segments comprises determining which of said sentences are evidence sentences by determining which of said sentences are part of said evidence, and said determining of the boundaries for said evidence comprises joining consecutive sentences of said evidence sentences which pertain to the same piece of evidence of said evidence.

In some embodiments, said determining of the boundaries for said evidence comprises joining consecutive sentences of said sentences which are determined to pertain to the same topic to receive candidate evidence text segments, and said identifying of said evidence text segments comprises determining which of said candidate evidence text segments are evidence text segments by determining which of said candidate evidence text segments are part of said evidence.

In some embodiments, the method further comprises using said at least one hardware processor for identifying evidence paragraphs in said at least one content resource predicted to include said evidence, wherein said identifying of said evidence text segments and said determining of said boundaries for said evidence are performed in said evidence paragraphs.

In some embodiments, the method further comprises using said at least one hardware processor for assigning each piece of said evidence a confidence score indicating the level of certainty in said each piece of evidence.

In some embodiments, said program code is further executable by said at least one hardware processor to divide said text of said at least one content resource into sentences.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Detection of evidence in unstructured text data with respect to a given context is disclosed herein. The given context may be, for example, a claim and/or a topic (the last also referred to as a Topic Under Consideration (TUC)). The detected evidence may support or oppose the given claim, optionally, in the context of a given TUC, or it may pertain to the given TUC (e.g., in case only a TUC is provided). The evidence may be detected in different content sources, and with respect to claims and/or TUCs pertaining to various domains. This task may have many practical applications in decision support and persuasion enhancement, in a wide range of domains. The evidence detection may be performed by utilizing a benchmark data set tailored for this task, which allows training statistical models and assessing their performance, and a supervised machine learning approach.

The disclosed systems and techniques may automatically pinpoint Context Dependent Evidence (CDE) to pertain to a given context within given content resources, such as documents. A detected CDE may be further required to be reasonably well phrased, and easily understandable in the given context, so that it may be instantly and naturally used, for example, to support or oppose a claim in a discussion. This task, which may be termed: Context Dependent Evidence Detection (CDED), may be of great practical importance in decision support and persuasion enhancement where relevant massive corpora are available.

The theory of argumentation, as described, for example, in Rieke and Sillars (1984), "Argumentation and the decision making process", which is incorporated herein by reference in its entirety, has suggested that evidence may be categorized into different types. Naturally, different types of evidence may have different statistical characteristics, hence the identification of evidence, as disclosed herein, aims to give specific consideration to each of these types. For example, using the definitions from the literature, and adjusting them for the purpose of the disclosed evidence identification, six examples of evidence types may be as follows:

(1) Analogy evidence may include illustrations from a different domain;

(2) Anecdotal evidence may include descriptions of specific event(s) (i.e., event evidence) and/or instance(s) and/or concrete example(s);

(3) Causal evidence may include descriptions of a process and/or a mechanism and/or reasons that explain why the claim is valid;

(4) Details evidence may include expansion of the claim idea via typically a few abstract details and/or abstract examples;

(5) Expert evidence may include testimony by a person and/or group and/or committee and/or organization with some expertise and/or authority on the subject; and (6) Study evidence may include results of a quantitative analysis of data, given as numbers, or as conclusions.

Such evidence types are described in Z. Seech, 2008, "Writing Philosophy Papers", Cengage Learninga, and R. D. Rieke and M. O. Sillars, 2001, "Argumentation and Critical Decision Making", Longman, which are incorporated herein by reference in their entirety. Additional types of evidence may be defined depending on the use-case and/or the data being mined.

The distinction between CDE and other related texts may be quite subtle, with many potential distractors: text which has the characteristics of a certain evidence type, but does not support or oppose the given claim (such as segment 3 in the example below); text which supports the claim, but is irrelevant in the context of the TUC (such as segment 2 in the example below); text which entails the claim, but adds no new information to it (such as segment 4 in the example below). A supervised learning approach may be used to overcome these difficulties.

The disclosed evidence detection may be used in a wide range of scenarios. For example, as a stand-alone tool that enhances decision making processes when context such as a claim is provided by the user; for supporting human debate on a given TUC, in conjunction with systems and techniques that automatically detects the relevant claims as disclosed in U.S. patent application Ser. No. 14/265,408, filed Apr. 30, 2014, which is incorporated herein by reference in its entirety.

The term "topic under consideration" (TUC) as referred to herein, may relate to a single free-text sentence.

The term "claim" as referred to herein, may relate to a general, concise statement with respect to a topic. For example, a claim may be a statement that directly supports or contests a topic.

The term "context" as referred to herein with respect to evidence, may relate to a text segment which may frame and/or provide constraints to the nature and/or association of the evidence.

The term "evidence" as referred to herein with respect to a context and the term "Context Dependent Evidence" (CDE) may relate to one or more text segments that directly support or oppose the context. A context may be, for example, a claim and optionally its TUC and accordingly evidence may support the claim in the context of the TUC or in general.

Examples of the above concepts are provided herein below.

TUC: Use of performance enhancing drugs (PED) in professional sports.
Claim A: PED can be harmful to your health.
Segment 1: The International Agency for Research on Cancer classifies androgenic steroids as: "Probably carcinogenic to humans."—a CDE.
Segment 2: FDA does not approve ibuprofen—not CDE (ibuprofen is considered a PED).
Segment 3: The UN estimates there are more than 50 million regular users of heroin, cocaine and synthetic drugs—not CDE.
Segment 4: Doping can ultimately damage your health—not CDE.
Claim B: Use of PED is inline with the spirit of sport.
Segment 5: Professor Savulescu, a philosopher and bioethicist, believes that biological manipulation embodies the sports spirit: the capacity to improve ourselves on the basis of reason and judgment—a CDE.

The term "content resource", may relate to unstructured text data and/or free-text corpora, e.g. Wikipedia, newspaper archives, scientific literature, blogs, etc.

The term "segment", as referred to text, may relate to any portion of the text, including a section, a paragraph, a sentence or even a portion of a sentence.

The term "paragraph", as referred to text, may relate to one or more consecutive sentences.

Figure 1:
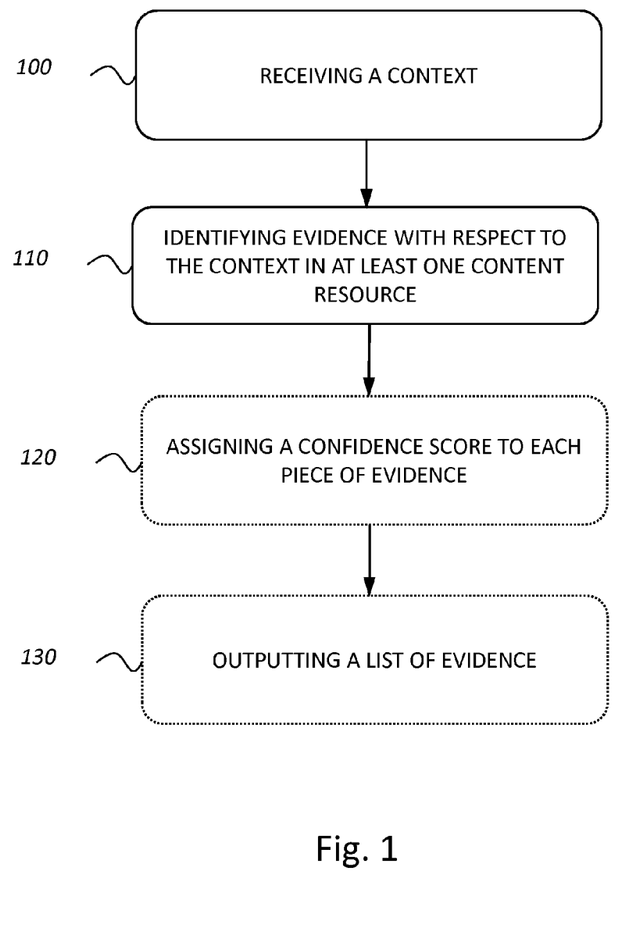
FIG. 1 shows a flowchart of a method, constructed and operative in accordance with an embodiment of the disclosed technique.

Reference is now made to FIG. 1, which shows a flowchart of a method, constructed and operative in accordance with an embodiment of the disclosed technique.

In a step 100, a context may be received. The context may include, for example, a claim. The claim may directly support or contest a TUC. Optionally, the TUC may be received as well. Optionally, the context may include a TUC only.

In a step 110, evidence with respect to the context may be identified in at least one content resource. The identifying of the evidence may include identifying of context-free features in the one or more content resources that generally characterize evidence, and identifying of context features in the one or more content resources, indicative of the relevance of text segments in the content resource to the context.

For example, if the received context includes a claim and a TUC, then evidence, which support or oppose the claim in the context of the TUC, may be identified. If the received context includes only a claim, evidence which support or oppose the claim in general, i.e., not necessarily in the context of a particular TUC, may be identified. If the received context includes only a TUC, then evidence which support or oppose the TUC in general (e.g., evidence which support or oppose any claim in the context of the TUC) may be identified.

The identification may be performed, for example, by a function or a plurality of functions (will be referred herein below as an "evidence function"), implemented by computer software. The evidence function may receive the context as input. The evidence function may be configured to identify evidence in one or more specific content resources. Alternatively, one or more content resources may be received as additional input.

The content resource may be the content resource from which the context or at least a portion of it was extracted. In case the content resource is received as input, it may be received in a form of a link to the content resource, such as a hyperlink. The content resource may include textual content, and may be, for example, a document such as a Word document or an HTML document. The identification may be performed by utilizing a machine learning approach (supervised or unsupervised). In such a case, the evidence function may be one or more trained classifiers.

In some embodiments, a classifier may be generated for each evidence type. Each of such classifiers may be trained in advance using manually labeled text data and/or massive amounts of unlabeled, yet relevant, text data. The classifier may then be used to identify evidence for any given context referring to any domain. Advantageously, the disclosed systems, methods and computer program products may be adjusted and tailored to operate with respect to a given specific domain, for use-cases under which the domain is known in advance.

The actual implementation of the disclosed evidence detection may vary, depending on the details and statistical characteristics of the textual resource. For example, for a Wikipedia article the disclosed evidence detection may exploit information in detailed citations, while for a commentary article published in a daily newspaper such as the New-York Times, such information may not exist.

The identifying of evidence may be approached in different ways. For example, the task may be conceptually divided into two sub-tasks: identifying evidence text segments in the text of the content resource which may serve as evidence for the received context and determining boundaries for the evidence in the text of the content resource. A text segment may, for example, include one or more pieces of evidence, may be a piece of evidence or may be a portion of a piece of evidence. In some embodiments, the sub-task of identifying evidence text segments may be performed first and then the subtask of boundaries determination may be performed while utilizing the identified evidence text segments. In some other embodiments, it may be performed vice versa. Evidence boundaries may be determined first (i.e., by identifying candidate boundaries) and identification of the evidence within said boundaries may then follow.

These two tasks may be addressed by many different approaches. For example, one or more components may address each task. These components may use one or more classifiers. A first component may divide the text into sentences. A second component (or alternatively, the first component) may address the sub-task of evidence text segments identification. If the evidence text segments identification is performed first, then this component may use one or more classifiers (e.g., when using a different classifier for each type of evidence) to determine for each sentence if it is part of evidence for the received context (i.e., the sentence may be a piece of evidence or may be a portion of such a piece of evidence). For this purpose, context-free features and context features may be utilized as detailed herein below. Optionally, the two-step classification approach may be utilized, as further detailed herein below. Thus, evidence sentences may be determined (i.e., sentences which are predicted to be part of CDE).

A third (or second) component may address the sub-task of evidence boundary determination. If the evidence text segments identification is performed first, then this component may be used to ascertain if consecutive evidence sentences pertain to the same piece of evidence. Such determination may be performed by identifying if two consecutive evidence sentences pertain to the same topic (e.g., by identifying similarity between the evidence sentences subjects). Accordingly, consecutive evidence sentences which pertain to the same piece of evidence may be joined. As a result, bounded evidence text segments (i.e., by determining the evidence boundaries) in the text, each including one or more sentences which are predicted to form a piece of evidence for a given context, are received. Optionally, a forth component (or the third) may aim to refine the evidence boundaries determination. Such a component may identify the exact start and end point of the evidence within these refined evidence text segments, e.g., within the evidence sentences, by 'breaking' these sentences.

In case the evidence boundaries are determined first, the third component may be used to determine if consecutive sentences pertain to the same topic (e.g., by determining similarity between the subjects of such sentences). Consecutive sentences which pertain to the same topic may be joined to receive candidate evidence text segments. Each of such segments may be or may include a piece of evidence. The second component may be then used to determine which of these candidate evidence text segments are indeed evidence text segments, by determining which of the candidate evidence text segments are part of evidence referring to the received context. In order to determine that, context-free features and context features may be utilized as detailed herein below. Optionally, the two-step classification approach may be utilized, as further detailed herein below.

Optionally, evidence paragraphs, which are predicted to include CDE, may be initially identified in the content resource. Such evidence identification may be performed according to the techniques described herein below. Following the above, the identification of the evidence text segments and/or the determination of the boundaries may be performed only within these identified evidence paragraphs. Furthermore, only the identified evidence paragraphs may be divided into sentences.

The disclosed classifiers may typically rely on techniques from domains such as machine learning, statistical analysis, natural language processing, and so forth, and may further exploit various resources available in such domains.

In addition, a classifier according to the disclosed techniques may typically exploit two types of features: context-free features that characterize evidence in its general sense and context features that assess the relevance of the text to the context, such as a claim and a TUC or to a claim or a TUC in general.

Context-free features that characterize evidence in its general sense may be, for example, for evidence of type study, features that may try to determine if the text indeed deals with quantitative analysis of data. Such features may include the existence of certain keywords (such as "study", "research", "correlation", "statistical", "analysis", etc), the appearance of numbers in the text, the presence of a citation, etc.

Context features that assess the relevance of the text to the context may be based on the relations between terms included in the sentence (i.e., a sentence which was identified as an evidence sentence) and terms included in the context. For example, if the context includes a claim, the features may be based on the relations between terms included in the sentence and terms included in the claim, while further considering terms included in the TUC if a TUC is also received as input.

Optionally, a two-step classification approach may be applied. A separate classifier may be applied on top of each of these feature sets that are then applied consecutively. Accordingly, text segments in the content resource may be identified by applying a context-free classifier to the content resource. The context-free classifier may use only context-free features. As a result, text segments predicted to include evidence may be received. The text segments may be scored and assigned with the scores, correspondingly, to reflect the probability that these segments include evidence. Consecutively, a second, context classifier, may be applied to the identified text segments to receive CDE. The context classifier may use only context features to receive CDE. In some embodiments, the context classifier may be applied to a predefined percentage of the text segments which are assigned with the highest scores (i.e., the text segments with the highest probability of including evidence).

The context-free features that may be used may rely on underlying machineries such as external lexicons and manually and automatically compiled internal lexicons, named entity recognizer, regular expression patterns, and a subjectivity classifier.

The context features that may be used may be, for example, of a type characterized by: semantic relatedness between text of the content resource and the context; semantic relatedness between information in the environment of text of the content resource and the context; and if the content resource includes the context, relative location of the context and a candidate text in the content resource may be used.

In order to train a classifier for each evidence type one may typically use manually labeled data, where human labelers mark evidence of the defined type for a given context in related articles. Alternatively, or in addition, unsupervised learning techniques may be applied for relevant massive corpora.

In an optional step 120, a confidence score may be assigned to each piece of evidence. The confidence score may indicate the level of certainty in the suggested candidate evidence (i.e., the level of certainty arising from the process of identifying the piece of evidence, as described herein above). Such a confidence score may be an output of the evidence function or the classifier.

In an optional step 130, a list of evidence may be outputted. The list of evidence may be sorted according to their confidence scores. The output of the list of evidence may be such that it may be used by a human or by a machine, including software components (e.g., when the disclosed evidence detection is incorporated in a more extensive tool). The output may be presented to the user, e.g., by displaying the list of evidence, uttering (i.e., by using known in the art text-to-speech techniques) it or by printing it.

Figure 2:
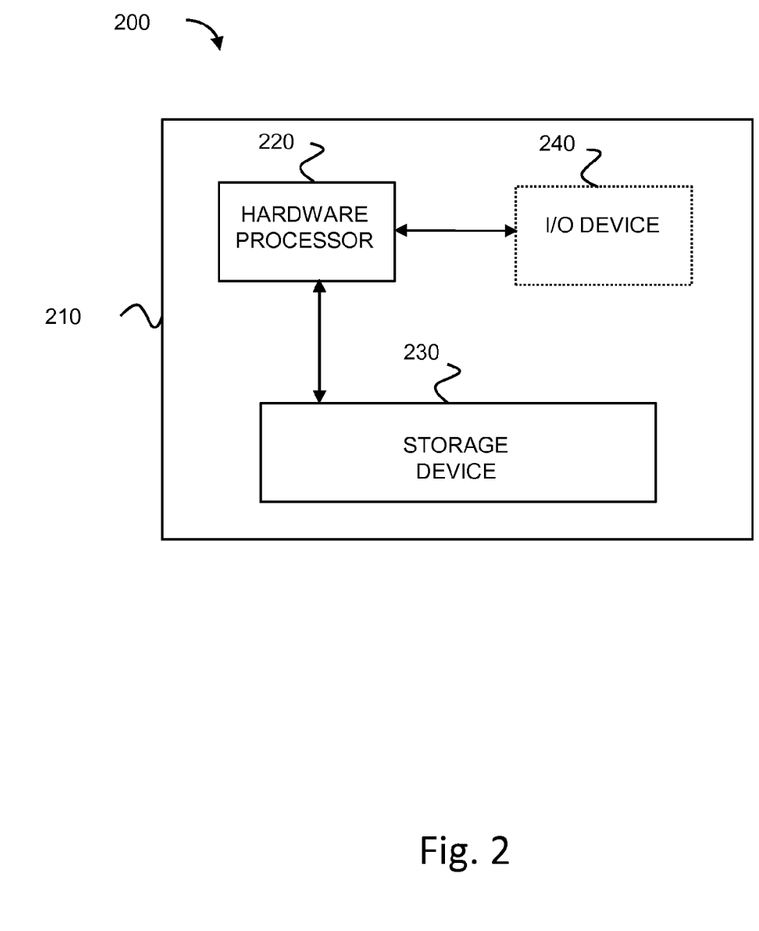
FIG. 2 shows an exemplary system according to an embodiment.

Reference is now made to FIG. 2, which shows an exemplary system 200 according to an embodiment. System 200 may include a computing device 210. Computing device 210 may include a hardware processor 220, a storage device 230 and an optional input/output ("I/O") device 240. Hardware processor 220 may include one or more hardware processors, storage device 230 may include one or more storage devices and I/O device 240 may include one or more I/O devices. Hardware processor 220 may be configured to execute the method of FIG. 1. I/O device 240 may be configured to allow a user to interact with system 200. For example, I/O device 240 may include a display, a loudspeaker and/or a printer which may for example output a list of evidence for a user according to the method of FIG. 1. Dedicated software, implementing the method of FIG. 1 may be stored on storage device 230 and executed by hardware processor 220.

In some embodiments, computing device 210 may include an I/O device 240 such as a terminal, a display, a keyboard, a mouse, a touch screen, a recorder, a loudspeaker, a printer, an input device and/or the like to interact with system 200, to invoke system 200 and to receive results. It will however be appreciated that system 200 may operate without human operation and without I/O device 240.

In some exemplary embodiments of the disclosed subject matter, storage device 230 may include or be loaded with a user interface. The user interface may be utilized to receive input, such as a context and optionally a content resource and/or provide output, such as a list of evidence, to and from system 200, including receiving specific user commands or parameters related to system 200, providing output, or the like.

EXPERIMENTAL RESULTS

Experiment 1

Data

In an experiment conducted according to the disclosed techniques, a supervised learning approach was used, which relied on labeled data that were collected as follows. Given a TUC and a corresponding relevant claim, extracted from a Wikipedia article by human labelers, the labelers were asked to mark text segments supporting the claim. To limit the amount of time labelers spend on these tasks, labeling was restricted to the article in which the claim was found. Due to the high complexity of this labeling task, in-house labelers were used whom were provided with detailed guidelines, and underwent rigorous training.

Furthermore, the task was split into two stages: detection and confirmation. In the detection stage, five labelers read the article, and marked all CDE candidates they located. In the confirmation stage all the candidates suggested by the labelers were presented to another set of five labelers, which confirmed or rejected each candidate, and determined the type(s) of accepted candidates. Candidates which were confirmed by the majority of the labelers were considered CDE, and were assigned the type(s) selected by at least three labelers.

The data used for the experiment included 12 TUCs selected at random from Debatabase (http://idebate.org/debatabase) covering a wide variety of domains from atheism to the US responsibility in the Mexican drug wars. In total 1290 pieces of CDE were found for 361 distinct claims in 103 articles. Table 1 below presents the total number of claims for which pieces of CDE were found and average number of pieces of evidence per claim for the different types. Standard deviations are given in parenthesis.

TABLE 1

| Evidence Type | # claims | avg. # CDE per claim |
|---|---|---|
| Study | 162 (9.2) | 2.6 (2.6) |
| Expert | 231 (18.1) | 2.2 (2.0) |
| Anecdotal | 163 (10.1) | 3.2 (4.4) |

For example, for type Study, on average, a claim has 2.6 pieces of CDE, spanning together an average of 4.7 sentences, whereas an average article in the data consists of 168 sentences. A CDE might overlap the sentence which includes the claim. Such cases represent degenerate, and to some extent easier, cases of CDED, since they merely require to determine if the claim's sentence includes additional supportive details, as opposed to searching for CDE in new sentences, that are potentially not even in the claim's vicinity. Therefore, such cases were omitted from the data.

Classification Approach

The utilized approach initiated by determining if a given sentence represents a CDE or a part of it.

Each evidence type may have different characteristics. For example, anecdotal evidence usually does not include numbers, other than perhaps in the context of dates. However, numbers are common in study evidence. Correspondingly, a different classifier may be developed for each evidence type, denoted Ty, and in some cases different features for the different classifiers may be selected.

At the beginning of the experiment, one classifier per evidence type was trained (a one step approach). Specifically, Logistic Regression (LR) was used due to its efficiency and its model interpretability, and the efforts were focused on identifying highly discriminative features for this classifier. The training data for each classifier consisted of all [claim, sentence] pairs where each claim is paired with all sentences in the article in which it was found. Positive examples were pairs for which the sentence overlaps a CDE of type Ty found for that claim, while all other pairs were considered as negative examples.

Two main types of features which may be useful for the task were observed: context-free features, which do not take the claim or TUC into account, and examine only the content of the candidate text, and context features, which examine the relation between the claim, and perhaps the TUC as well, to the evidence candidate.

Following this observation, the two-step classification approach was examined. In this approach a separate classifier was developed on top of each of these feature sets that are then applied consecutively. Specifically, a context-free classifier was first applied that uses only the context-free features. The training data for this classifier was composed of all sentences in the labeled articles. Positive examples were considered as all sentences which overlap a labeled CDE of type Ty for any claim found in the article, while the remaining sentences served as negative examples. Based on the results of this classifier the 85% lowest score sentences were filtered, and a context classifier that uses only the context-features was applied over the remaining 15% of the sentences. The training data for this second classifier are [claim, sentence] pairs from the claim's article. Positive examples are pairs for which the sentence overlaps a CDE found for that claim. Negative examples are pairs for which the sentence overlaps a CDE found for a different claim.

This two step approach may be advantageous since it amplifies the signal of the context features that aim to determine the semantic relatedness between the claim and candidate CDE. When tackling both problems simultaneously the training data include sentences which are highly related to the claim, but are either CDE of a different type, or not a CDE at all—e.g., definitions of some aspects of the claim. These sentences complicate the signal that should be captured by the semantic relatedness features, as they represent candidates with negative labels that are still semantically related to the claim. By separating the tasks, one can define the input data to the context classifier to ignore such sentences. Furthermore, it may significantly reduce the overall run time. Most of the context features are typically more complex and hence may require more computing time. By filtering out 85% of the candidates at the first stage, one may reduce the number of candidates for which one have to calculate these features.

Features

Context Free Features

The context free features may rely on four underlying machineries: External lexicons (e.g., the Harvard IV-4 dictionary) and manually and automatically compiled internal lexicons; Named Entity Recognizer (NER); regular expression patterns; and a subjectivity classifier.

The Stanford NER (http://nlp.stanford.edu/software/CRF-NER.shtml) as described by Jenny Rose Finkel, Trond Grenager, and Christopher Manning, 2005, "Incorporating non-local information into information extraction systems by gibbs sampling", In Proceedings of the 43rd Annual Meeting on Association for Computational Linguistics, ACL '05, pages 363-370, Stroudsburg, Pa., USA. Association for Computational Linguistics, which is incorporated herein by reference in its entirety, was used to extract standard entities such as person and organization. A Watson NER, as described in: Adam Lally, John M. Prager, Michael C. McCord, Bra-nimir Boguraev, Siddharth Patwardhan, James Fan, Paul Fodor, and Jennifer Chu-Carroll, 2012, "Question analysis: How Watson reads a clue." IBM Journal of Research and Development, 56(3):2, which is incorporated herein by reference in its entirety, was used to extract more fine grained categories such as "educational organization" and "leader". Regular expressions may be used to identify features like whether the text is part of a quotation, does it contain a citation, and does it contain numeric quantitative results. In addition, complex regular expressions which rely on the NER and lexicon machineries may be used to capture patterns indicative of different types. For example, a common pattern which was observed for expert evidence is: [Person/organization, 0 to 10 wildcard words, an opinion verb such as "believe", "conclude", etc.] (as shown, for example, in segment 5 of the above example).

Context Features

The context features may be conceptually divided into three types: semantic relatedness between the candidate and the claim; semantic relatedness between information in the candidate environment and the claim; and relative location of the claim and the candidate in the Wikipedia article.

Semantic relatedness was measured by calculating the cosine similarity between Term Frequency-Inverse Document Frequency (TF-IDF) vectors representing the claim and the candidate, augmented with acronyms, stems, and lexical relations through WordNet (http://wordnet.princeton.edu/). Specifically, semantic relatedness was measured between the claim and: specified slots in the candidate as detected by a slot grammar parser, as described in M. C. McCord, J. W. Murdock, and B. K. Boguraev, 2012, "Deep parsing in Watson", IBM J. Res. Dev., 56(3):264-278, May, which is incorporated herein by reference in its entirety; the entire candidate; sentences immediately surrounding the candidate; the header or sub-header of the section or sub-section containing the candidate; and titles of citations referred to from the candidate.

Results

The algorithms were evaluated using the leave one out schema: for each topic, the classifier(s) were trained using the claims and associated CDE in all other topics, and then the model was applied to the left out topic. The macro-averaged results are presented in Table 2 below.

TABLE 2

| Type | MRR | | | AUCROC | |
| --- | --- | --- | --- | --- | --- |
| | 1 step approach | 2 steps approach | random | 1 step approach | 2 steps approach |
| Study | 0.47 (0.22) | 0.47 (0.12) | 0.1 (0.06) | 0.87 (0.06) | 0.86 (0.07) |
| Expert | 0.41 (0.18) | 0.44 (0.18) | 0.11 (0.12) | 0.84 (0.07) | 0.80 (0.1) |
| Anecdotal | 0.20 (0.08) | 0.24 (0.13) | 0.14 (0.13) | 0.60 (0.15) | 0.71 (0.11) |

To facilitate the comparison of the two approaches, when assessing the results of the two-step algorithm, all candidates which were filtered out in the first stage below these which were not filtered were ranked, according to their score in the first step. Alongside the area under the receiving operating characteristic (AUCROC), the mean reciprocal rank (MRR) is reported. This is motivated by the observation that in the discussion use case, it is usually more important to be able to support many claims, than to provide all the evidence available.

Although the labeled data does not allow precise assessment of the first step in the two step approach, the performance may be estimated by calculating the recall over the top 15% of the candidates. A recall of 0.69, 0.67 and 0.32 was achieved for types Study, Expert and Anecdotal, respectively, compared to 0.15 expected at random.

In addition, the order of the steps in the two step approach was switched and the context classifier was run as the first classifier. This resulted in a lower recall over the top 15% candidates (0.47, 0.48 and 0.29 for types Study, Expert and Anecdotal, respectively).

Experiment 2

Data

In another experiment conducted according to the disclosed techniques, a supervised learning approach was also used.

In this approach, the boundaries of candidate pieces of evidence were determined at first. It was noted from labeled data that evidence may span between one sentence to several sentences, but the majority of the candidate pieces of evidence (90%) are up to three sentences. Therefore, to simplify the approach, the size of a candidate piece of evidence (or simply 'a candidate') was limited to three sentences. Additionally, at the beginning, the focus was on identifying the sentences to be included in the candidate piece of evidence, and accordingly, sentences were not broken. An additional component may be additionally used, optionally at a later stage, to refine the boundaries.

A classifier was trained, such that for a given two consecutive sentences, it may predict if these sentences should be joined to form together a candidate. The training data for this classifier was pairs of consecutive sentences where at least one was part of labeled evidence. If both were part of the same piece of evidence, they were considered a positive example, otherwise (one was part of a piece of evidence and the other was not, or a part of a different piece of evidence) they were considered a negative example.

The features which were used for this classifier considered information such as: shared co-reference between the sentences; if the sentences are on the same topic; a citation which starts in one sentence and continues in the other; discourse markers at the beginning of the second sentence; and a description of a study in the first sentence, without reference to a citation, where the citation is only given in the second sentence.

Features and Classification

The two steps approach and the context-free and context classifiers described in the first experiment above were used with the difference that the context classifier used only a given topic (i.e., TUC; as opposed to a claim). The training data used for the context classifier was the same as used for the context-free classifier described herein above, but with the addition of the topic. The features which were used for the classifier were based on semantic relatedness between the topic and the candidate piece of evidence.

If claims are provided for the topic, they may be used to improve the detection of evidence for the topic, for example by using them to build a lexicon describing the TUC, and measure the semantic relatedness to this lexicon.

Results

These algorithms were evaluated using the leave one out schema: for each topic, the classifiers were trained by using the associated CDE in all the other topics, and then applied the model to the left out topic. The macro-averaged results are presented below.

A candidate piece of evidence was considered to be a true positive if it includes all of the sentences in a labeled piece of evidence, and no additional sentences.

TABLE 3

| Evidence Type | MRR for Evidence for Topic including boundaries |
|---|---|
| Study | 0.56 |
| Expert | 0.54 |
| Event | 0.15 |

For types Study and Expert, the present method has shown very good performance, promising that on average, the first true Evidence will be among the first two results. For type Event, the results are much above random; it is believed they can be improved by providing a larger amount of Evidence from this type to train the classifier.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
    receiving a context, wherein the context is a digital text segment;
    identifying evidence with respect to the context in at least one content resource, wherein the at least one content resource comprises at least one of unstructured digital text data and free-text digital corpora, and wherein the identifying comprises:
        a) identifying context-free features in the at least one content resource, that generally characterize certain one or more digital text segments in the at least one content resource as evidence, wherein the context-free features comprise at least one of (i) numbers and (ii) keywords that indicate a quantitative analysis of data, and wherein the identifying of the context-free features comprises applying a first machine learning classifier to the at least one content resource, wherein the first machine learning classifier is trained on digital texts in which evidence was manually labeled, and
        b) identifying, in the certain one or more digital text segments, context features indicative of the relevance of at least some of the certain one or more digital text segments to the context, wherein the relevance is defined as direct support of or opposition to the context, and wherein the identifying of the context features comprises applying a second machine learning classifier to the certain one or more digital text segments, wherein the second machine learning classifier is trained on digital texts that were output by the first machine learning classifier and were manually labeled as evidence that supports or opposes a training context; and
    outputting a list of said identified evidence.

2. The method of claim 1, wherein the context comprises at least one of a claim and a Topic Under Consideration (TUC), wherein the claim is a concise textual statement with respect to a topic, and wherein the TUC is a single free-text sentence.

3. The method of claim 1, wherein said identifying of said evidence comprises using a classifier for each type of evidence.

4. The method of claim 1, wherein said identifying of the context-free features further comprises assigning said certain one or more digital text segments with scores reflecting the probability that said certain one or more digital text segments comprise evidence, and wherein said second machine learning classifier is applied to a predefined percentage of the certain one or more digital text segments which are assigned with the highest scores.

5. The method of claim 1, wherein said identifying of evidence further comprises:
    determining boundaries for said evidence in said at least one content resource.

6. The method of claim 5, further comprising using said at least one hardware processor for dividing said text of said at least one content resource into sentences.

7. The method of claim 6, wherein:
said identifying of said evidence text segments comprises determining which of said sentences are evidence sentences by determining which of said sentences are part of said evidence, and
said determining of the boundaries for said evidence comprises joining consecutive sentences of said evidence sentences which pertain to the same piece of evidence of said evidence.

8. The method of claim 6, wherein:
said determining of the boundaries for said evidence comprises joining consecutive sentences of said sentences which are determined to pertain to the same topic to receive candidate evidence text segments, and
said identifying of said evidence text segments comprises determining which of said candidate evidence text segments are evidence text segments by determining which of said candidate evidence text segments are part of said evidence.

9. The method of claim 5, further comprising using said at least one hardware processor for identifying evidence paragraphs in said at least one content resource predicted to include said evidence, wherein said identifying of said evidence text segments and said determining of said boundaries for said evidence are performed in said evidence paragraphs.

10. The method of claim 1, further comprising using said at least one hardware processor for assigning each piece of said evidence a confidence score indicating the level of certainty in said each piece of evidence.

11. A computer program product comprising a non-transitory computer-readable storage medium having program code embodied therewith, the program code executable by at least one hardware processor to:
receive a context, wherein the context is a digital text segment;
identify evidence with respect to the context in at least one content resource, wherein the at least one content resource comprises at least one of unstructured digital text data and free-text digital corpora, and wherein the identifying comprises:
  a) identifying context-free features in the at least one content resource, that generally characterize certain one or more digital text segments in the at least one content resource as evidence, wherein the context-free features comprise at least one of (i) numbers and (ii) keywords that indicate a quantitative analysis of data, and wherein the identifying of the context-free features comprises applying a first machine learning classifier to the at least one content resource, wherein the first machine learning classifier is trained on digital texts in which evidence was manually labeled, and
  b) identifying, in the certain one or more digital text segments, context features indicative of the relevance of at least some of the certain one or more digital text segments to the context, wherein the relevance is defined as direct support of or opposition to the context, and wherein the identifying of the context features comprises applying a second machine learning classifier to the certain one or more digital text segments, wherein the second machine learning classifier is trained on digital texts that were output by the first machine learning classifier and were manually labeled as evidence that supports or opposes a training context; and
output a list of said identified evidence.

12. The computer program product of claim 11, wherein said identifying of the context-free features further comprises assigning said certain one or more digital text segments with scores reflecting the probability that said certain one or more digital text segments comprise evidence, and wherein said second machine learning classifier is applied to a predefined percentage of the certain one or more digital text segments which are assigned with the highest scores.

13. The computer program product of claim 11, wherein said identifying of evidence further comprises:
determining boundaries for said evidence in said at least one content resource.

14. The computer program product of claim 13, wherein said program code is further executable by said at least one hardware processor to divide said text of said at least one content resource into sentences.

15. The computer program product of claim 14, wherein:
said identifying of said evidence text segments comprises determining which of said sentences are evidence sentences by determining which of said sentences are part of said evidence, and
said determining of the boundaries for said evidence comprises joining consecutive sentences of said evidence sentences which pertain to the same piece of evidence of said evidence.

16. The computer program product of claim 14, wherein:
said determining of the boundaries for said evidence comprises joining consecutive sentences of said sentences which are determined to pertain to the same topic to receive candidate evidence text segments, and
said identifying of said evidence text segments comprises determining which of said candidate evidence text segments are evidence text segments by determining which of said candidate evidence text segments are part of said evidence.

17. The computer program product of claim 11, wherein said identifying of said evidence comprises using a classifier for each type of evidence.

18. A system comprising:
(i) a non-transitory storage device having stored thereon instructions for:
  receiving a context, wherein the context is a digital text segment;
  identifying evidence with respect to the context in at least one content resource, wherein the at least one content resource comprises at least one of unstructured digital text data and free-text digital corpora, and wherein the identifying comprises:
    a) identifying context-free features in the at least one content resource, that generally characterize certain one or more digital text segments in the at least one content resource as evidence, wherein the context-free features comprise at least one of (i) numbers and (ii) keywords that indicate a quantitative analysis of data, and wherein the identifying of the context-free features comprises applying a first machine learning classifier to the at least one content resource, wherein the first machine learning classifier is trained on digital texts in which evidence was manually labeled, and
    b) identifying, in the certain one or more digital text segments, context features indicative of the relevance of at least some of the certain one or more digital text segments to the context, wherein the relevance is defined as direct support of or opposition to the context, and wherein the identifying of the context features comprises applying a second machine learning classifier to the certain one or more digital text segments, wherein the second machine learning classifier is trained on digital texts that were output by the first machine learning classifier and were manually labeled as evidence that supports or opposes a training context; and outputting a list of said identified evidence; and (ii) at least one hardware processor configured to execute said instructions.

19. The system of claim 18, wherein said identifying of the context-free features further comprises assigning said certain one or more digital text segments with scores reflecting the probability that said certain one or more digital text segments comprise evidence, and wherein said second machine learning classifier is applied to a predefined percentage of the certain one or more digital text segments which are assigned with the highest scores.

20. The system of claim 18, wherein said identifying of evidence further comprises determining boundaries for said evidence in said at least one content resource;

said instructions are further for dividing said text of said at least one content resource into sentences;

said identifying of said evidence text segments comprises determining which of said sentences are evidence sentences by determining which of said sentences are part of said evidence; and said determining of the boundaries for said evidence comprises joining consecutive sentences of said evidence sentences which pertain to the same piece of evidence of said evidence.

* * * * *